US011338789B2

(12) United States Patent
Gruner et al.

(10) Patent No.: US 11,338,789 B2
(45) Date of Patent: May 24, 2022

(54) METHOD FOR CONTROLLING A DRIVE SYSTEM, AND DRIVE SYSTEM

(71) Applicant: BENTLEY MOTORS LIMITED, Crewe (GB)

(72) Inventors: Steffen Gruner, Gifhorn (DE); Benjamin Kaczor, Meine (DE); Norbert Weiss, Sickte (DE); Axel Ibenthal, Braunschweig (DE)

(73) Assignee: Bentley Motors Limited, Crewe (GB)

( * ) Notice: Subject to any disclaimer, the term of this patent is extended or adjusted under 35 U.S.C. 154(b) by 298 days.

(21) Appl. No.: 16/303,116

(22) PCT Filed: May 15, 2017

(86) PCT No.: PCT/EP2017/061548
§ 371 (c)(1),
(2) Date: Jul. 22, 2020

(87) PCT Pub. No.: WO2017/198582
PCT Pub. Date: Nov. 23, 2017

(65) Prior Publication Data
US 2020/0346632 A1 Nov. 5, 2020

(30) Foreign Application Priority Data

May 19, 2016 (DE) .......................... 102016208595.6

(51) Int. Cl.
*B60W 20/10* (2016.01)
*B60W 10/06* (2006.01)
*B60W 10/08* (2006.01)

(52) U.S. Cl.
CPC ............ *B60W 20/10* (2013.01); *B60W 10/06* (2013.01); *B60W 10/08* (2013.01); *B60W 2710/0666* (2013.01); *B60W 2710/083* (2013.01)

(58) Field of Classification Search
CPC ...... B60W 20/10; B60W 10/06; B60W 10/08; B60W 2710/0666; B60W 2710/083; Y02T 10/62; B60K 5/08
(Continued)

(56) References Cited

U.S. PATENT DOCUMENTS 6,862,511 B1  3/2005 Phillips et al.
9,688,263 B2  6/2017 Yamazaki et al.
(Continued)

FOREIGN PATENT DOCUMENTS

DE        10242230 A1   10/2003
DE    102004044507 A1    3/2006
(Continued)

OTHER PUBLICATIONS

Japanese Patent Application No. 2018-560762; Notice of Reasons for Refusal; dated Mar. 24, 2021.
(Continued)

*Primary Examiner* — Lindsay M Low
*Assistant Examiner* — Yi-Kai Wang
(74) *Attorney, Agent, or Firm* — Schwabe Williamson & Wyatt, P.C.

(57) ABSTRACT

The invention relates to a method for controlling a drive system with at least two drive units (20), each of which is paired with at least one control unit (22), wherein —a total target torque (30) is calculated by means of a master control unit (22*a*), —the total target torque (30) is divided into respective individual target torques (32) for each of the drive units (20) by the master control unit (22*a*), and —the drive units (20) are actuated by the paired control units (22) on the basis of the corresponding individual target torques (32). The invention is characterized in that the threshold torques (34) corresponding to the drive units (20) are ascertained
(Continued)

and taken into consideration by the master control unit (22a) when dividing the total target torque (30).

21 Claims, 1 Drawing Sheet

(58) Field of Classification Search
USPC .......................................................... 701/22
See application file for complete search history.

(56) References Cited

U.S. PATENT DOCUMENTS

| 2005/0060079 | A1 | 3/2005 | Phillips et al. |
| 2007/0266711 | A1 | 11/2007 | Falkenstein et al. |
| 2013/0035818 | A1 | 2/2013 | Meitinger et al. |
| 2013/0208022 | A1 | 8/2013 | Ryu et al. |
| 2017/0051709 | A1* | 2/2017 | Jasper ............... F02M 35/10072 |
| 2017/0291595 | A1* | 10/2017 | Kim .................... B60W 10/023 |

FOREIGN PATENT DOCUMENTS

| DE | 102008041463 A1 | 2/2010 |
| DE | 102010038995 A1 | 2/2012 |
| DE | 102012208765 A1 | 11/2013 |
| DE | 102013208022 A1 | 11/2013 |
| EP | 2151904 A2 | 2/2010 |
| JP | 08251712 A | 9/1996 |
| JP | H 09-228878 A | 9/1997 |
| JP | H11-94713 A | 4/1999 |
| JP | 2003-032802 A | 1/2003 |
| JP | 2003-204606 A | 7/2003 |
| JP | 2006280049 A | 10/2006 |
| JP | 2007112248 A | 5/2007 |
| JP | 2007209116 A | 8/2007 |
| JP | 2012-051539 A | 3/2012 |

OTHER PUBLICATIONS

Japanese Patent Application No. 2018-560762; Office Action; dated Dec. 17, 2021.

* cited by examiner

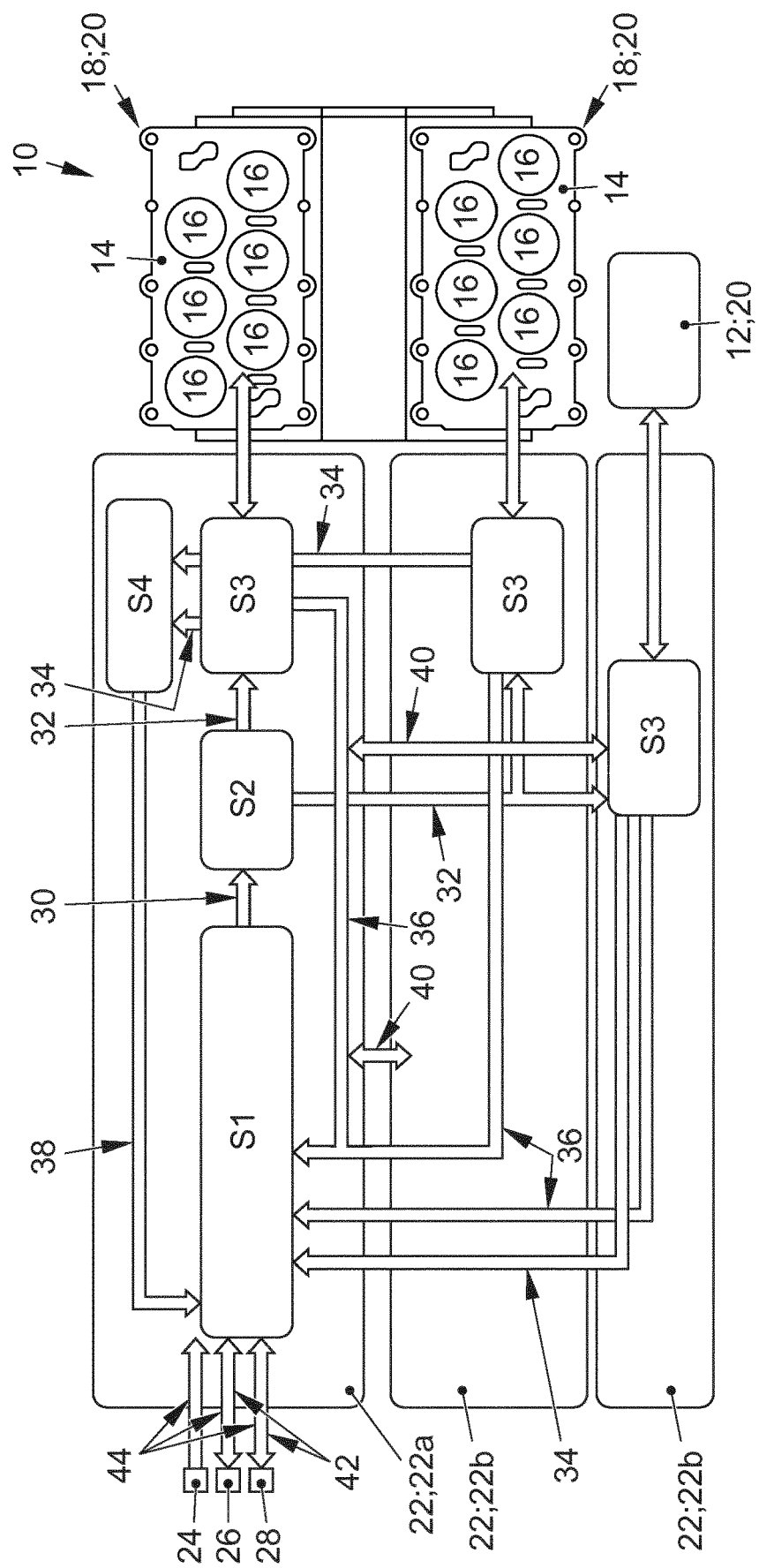

METHOD FOR CONTROLLING A DRIVE SYSTEM, AND DRIVE SYSTEM

CROSS REFERENCE TO RELATED APPLICATIONS

The present application is a national phase entry under 35 U.S.C. § 371 of International Application No. PCT/EP2017/061548, filed May 15, 2017, entitled "METHOD FOR CONTROLLING A DRIVE SYSTEM, AND DRIVE SYSTEM," which designated, among the various States, the United States of America, and which claims priority to DE 10 2016 208 595.6 filed May 19, 2016, both of which are hereby incorporated by reference.

The invention relates to a method for controlling a drive system with at least two drive units, each of which is paired with at least one control unit. The invention further relates to a corresponding drive system.

Drive systems of motor vehicles are controlled as a function of external constraints, in particular the position of an accelerator pedal set by a vehicle driver, by means of at least one control unit, the so-called engine control unit.

Due to the constantly increasing complexity of drive systems of modern motor vehicles, the computing power required to handle engine controls in the operation of drive systems is also increasing. This applies particularly to those drive systems of motor vehicles which combine several drive units. An example of this are so-called hybrid motor vehicles, which combine at least one internal combustion engine and one electric drive motor, where their individual drive outputs have to be co-ordinated with one another. In particular, in such drive systems, the computing power required to control of the various drive units may be so great that it is not always possible to provide a single engine control system which can also handle this computing power. One reason for this may be, for example, confined space in an engine compartment of a corresponding vehicle which does not allow a sufficiently powerful and hence relatively voluminous engine control system to be incorporated. As a rule, therefore, for drive systems with multiple drive units, multiple control units are used, of which at least one is paired with at least one of the drive units, and which are connected to one another. Thus it may be arranged that one of the control units acts as master control unit, which operates at a higher level than the other control units, frequently termed slave control units.

DE 102 422 430 A1, for example, describes a method for controlling a drive system of a motor vehicle in which, depending on the position of an accelerator pedal, a total torque is determined, which a torque interface divides into target torques for torque-controlled aggregates which are then transmitted to the individual control units of those aggregates. The torque-controlled aggregates may be, inter alia, an internal combustion engine and an electric drive.

A drive system for a hybrid vehicle is also known from DE 10 2008 041 463 A1 which comprises a combustion engine with associated engine control together with a number of electric drive motors with their associated control units. One of these control units is designated as the master control unit which transmits a torque request which has been sent by the engine control unit to the further control units paired with the electric drive motors.

DE 10 2010 038 995 A1 discloses an internal combustion engine with two banks of cylinders, each of which is paired with a control unit to control the operation of the bank of cylinders concerned. The control unit associated with the first bank of cylinders acts as the master control unit, which transmits requirements relating to disconnecting the second bank of cylinders to the other (slave) control unit.

DE 10 2013 208 022 A1 describes a hybrid vehicle which is prevented* from rolling back on a slope primarily by applying a torque to the wheels using an electric traction motor. If the temperature of the traction motor or an associated power converter exceeds a temperature limit, the traction motor is disconnected and an internal combustion engine is connected to the drive wheels which are slipping instead of to the traction motor to prevent it rolling back. A hybrid vehicle control system comprises a control unit paired with the internal combustion engine, a control unit paired with the traction motor and a higher-level vehicle control unit in overall control of both these units.

Coordinating multiple control units linked together with a common objective, namely implementing a driving condition desired by the driver of a motor vehicle as expressed by a specific position of the accelerator pedal, necessarily takes into account a plurality of additional parameters, leading regularly to errors which may result in corresponding error messages, reducing drive power and/or the driving comfort the drive system provides.

Based on this prior art, the aim of the invention is to provide an improved method for controlling a drive system with at least two drive units, each of which is paired with a control unit.

This object is achieved by means of a method in accordance with patent claim 1. Implementing a drive system suitable for carrying out such a method is the subject of patent claim 10. Advantageous embodiments of a drive system in accordance with the invention and preferred embodiments of the drive system in accordance with the invention are subjects of further patent claims and/or arise from the following description of the invention.

A method for controlling a drive system with at least two drive units, each of which is associated with at least one control unit, wherein a total target torque is calculated by a master control unit,
   the total target torque is divided by the master control unit into an individual target torque for each of the drive units and
   the drive units are controlled by the control units paired with them on the basis of their associated individual target torques, is characterised according to the invention in that the threshold torques associated with the drive units are determined and are taken into account by the master control unit when apportioning the total target torque. The determination is preferably made by the control units associated with the drive units, which then transmit this to the master control unit.

The invention is based on the knowledge that problems may arise particularly in the coordination of individual target torques determined by a master control unit on the basis of a total target torque or the control units paired with these drive units, if one or more of the drive units are not in a position, due to the situation or operating conditions, actually to achieve this individual target torque assigned to them, although they should actually be in a position to do so by the way they are designed.

In the following, 'threshold torque' is taken to mean the maximum torque which may be produced by a drive unit under current operating conditions which, due to the different factors involved, may be less than an absolute maximum torque which the drive unit may achieve based on its design, at least temporarily. Thus the threshold torque need not correspond to the actual torque currently provided by the drive unit. Input factors which may lead to a threshold torque being less than the absolute maximum torque are, for example, relatively low and/or high ambient temperatures, relatively low and/or high component temperatures, malfunctioning of individual components of the corresponding drive unit and how long it is operated in a specific operating condition, for example a drive unit which may only be operated temporarily at a defined overload (overboost).

A drive system in accordance with the invention, which comprises at least two drive units, of which each is paired with at least one control unit, is characterised in that a master control unit is provided and the master control unit and control units paired with the drive units are programmed so that a method in accordance with the invention may be executed with them.

The master control unit may be one of the control units paired with any of the drive units, which thus acts both as the master control unit and as the corresponding control unit paired with one of the drive units. It is also possible, as well as one of the control units paired with each of the drive units, to provide a master control unit to control these control units overall.

The method in accordance with the invention advantageously enables a drive system to operate in accordance with the invention, in that, if an individual target torque determined for a drive unit exceeds the associated threshold torque, the corresponding torque difference (i.e. the difference between the determined individual target torque and the associated threshold torque) is added, so far as is possible, preferably completely to the individual target torque of the other drive unit (if there are multiple further drive units, at least one, more than one or all of them). The individual target torque actually transmitted to the drive unit concerned having a relatively small threshold torque may be limited to the threshold torque. This is not absolutely necessary, however, because, in any event, no actual torque may be produced by the drive unit concerned in the operating state concerned which exceeds the threshold torque (this may lead to the individual target torques into which the total target torque is divided by the master control unit being able to be greater in total than this total target torque). In this way it may be avoided that operating one of the drive units at an actual torque which is limited to the associated threshold torque, wherein this threshold torque is temporarily below the individual target torque determined for this drive unit, has an adverse effect on the driving characteristics of the drive system overall, because the reduced limited actual torque of the drive unit concerned may be compensated for by the other drive unit(s).

In a preferred embodiment of the method in accordance with the invention, it may further be provided that the actual torques associated with the drive units are determined and a total actual torque is determined therefrom by the master control unit. A total actual torque determined thereby may advantageously be transmitted to a functional element, such as a control device for an electronic stability program or a control device for an automatic transmission, so that its functionality may be controlled as a function of the total actual torque.

As a consequence, a high level of torque output precision may be achieved, for example, and thus an automatic transmission may change gear more smoothly.

Such a procedure may be advantageously effected if, as preferably provided, the total target torque is determined as a function of a parameter which is transmitted by the function element to the master control unit. In particular, the total target torque determined may be divided into the individual target torques allocated to the individual drive units as optimally as possible.

A method in accordance with the invention may be implemented particularly advantageously in a drive system which comprises at least one internal combustion engine as a drive unit and at least one electric motor as an additional drive unit. Such a hybrid system requires not only a substantial level of computer control power, which may advantageously be handled by several interconnected control units, but also enables, particularly advantageously, the torque difference of a drive unit whose threshold torque is less than this allocated individual target torque to be compensated for by the corresponding other drive unit.

Moreover, a method in accordance with the invention may be implemented particularly advantageously with a drive system which comprises at least one internal combustion engine which is subdivided into several sub-engines, each of which is paired with a control unit. Such an internal combustion engine may be divided into sub-engines, for example, corresponding to individual cylinder banks which are formed by internal combustion engines in V, W or boxer designs. With such a design, the control system according to the invention may have a particularly advantageous effect on such a drive system, because a torque difference of a first of the sub-engines, whose threshold torque and thus its maximum achievable actual torque is temporarily less than an individual target torque allocated to it, may lead to the operating characteristics of the internal combustion engine deteriorating overall and thus, in particular, a loss of driving comfort and/or to fault diagnoses, particularly detecting misfirings, for example, which have actually not occurred. This may be prevented by limiting the individual target torque of the second sub-engine to the threshold torque of the first engine section, whereby its actual torques may always be kept substantially the same.

In a preferred embodiment of the method in accordance with the invention for control of such a drive system, it may therefore be provided that, if the individual target torque for the first sub-engine exceeds the associated threshold torque that was determined for a sub-engine (with more than two sub-engines, preferably for all other sub-engines) or the individual target torque to be transmitted to the corresponding drive units is reduced or restricted to the threshold torque for the first sub-engine. This may indeed lead to a reduction of the actual torque produced by the sub-engines as a whole, which may be preferable to impairing the operating characteristics of the internal combustion engine and/or incorrect fault diagnoses.

An actual torque produced entirely by one of the sub-engines may be largely unproblematic, particularly if, as provided in a preferred embodiment of the drive system according to the invention, as well as an internal combustion engine with several sub-engines, each qualifying as a drive unit, at least one electric motor acting as a drive unit is provided, because such an embodiment of the drive system enables the reduction of the actual torque produced by the sub-engines overall to be compensated for by the electric motor. Therefore, in a preferred embodiment of a method according to the invention for control of such a drive system, it may be provided that, if the individual target torque determined for a first sub-engine exceeds the associated threshold torque, the individual target torque determined or to be determined for a second engine section is reduced or limited to the threshold torque of the first sub-engine, the total of the difference of torques of the sub-engine or module is added, so far as is possible, preferably completely to the individual target torque of the electric motor.

The invention further relates to a computer program with a program code for executing a method in accordance with the invention when the computer program is executed on a computer.

The indefinite article ('a' or 'one'), particularly in the patent claims and in the description explaining the claims in general should be understood as such and not as a numeral. Correspondingly, components thus specified should be understood as being present at least once and possibly being present several times.

The present invention is explained in the following in more detail with the aid of the exemplary embodiments depicted in the drawing. The drawing:

FIG. 1: is a schematic representation, the implementation of a method in accordance with the invention with a drive system in accordance with the invention.

FIG. 1 shows a drive system in accordance with the invention with an internal combustion engine 10 and an electric motor 12 provided as drive motor. The drive system may be provided for driving a hybrid motor vehicle, not shown here, in which both the internal combustion engine 10 and the electric motor 12 (alternatively or in combination) may provide the power to propel the motor vehicle. In addition, FIG. 1 shows various steps in the procedure for carrying out the method according to the invention to control the drive system.

The internal combustion engine 10 is known, for example, in the form of a conventional reciprocating piston engine working on the petrol or diesel cycle, wherein this one has a total of twelve cylinders 16 arranged in a so-called W-configuration. Accordingly, the internal combustion engine 10 is configured as two banks of cylinders 14, each with six cylinders 16 which are positioned in two offset rows and hence in a narrow V layout. The two banks of cylinders 14 and further functional components (not shown) associated with them, particularly the components comprising the gas exchange valve systems (inlet valves, exhaust valves and valve actuating mechanisms), of the internal combustion engine each form a sub-engine 18 wherein the sub-engines 18 together with the electric motor 12 each represent one drive unit 20 of the drive system in accordance with the invention.

A control unit 22 is paired with each of these drive units 20 where the control unit 22 which is assigned to the first of the sub-engines 18 of the internal combustion engine 10 (in FIG. 1, the upper of the sub-engines 18), is designated and configured as the master control unit 22a.

In implementing a method according to the invention for controlling the drive system, it is planned that a value for a total target torque 30 is calculated by the master control unit 22a in a method step S1 which is to be made available to the drive system for driving the motor vehicle. This calculation of a total target torque 30 is made primarily in response to a signal 44 which indicates the position of the accelerator pedal 24 operated by the driver of the motor vehicle as well as in response to a signal 44, which results from the intervention or non-intervention of an electrical stability program controlled by a control device 26 which in response to a signal 44 indicates what gear and other operating conditions a manual or automatic gearbox 28 is in.

An electrical stability program involves controlling the brakes and also, where appropriate, the drive torque of the individual wheels of the motor vehicle, with the aim of stabilising the drive. The transmission 28 acts to transmit the drive speed and thus the drive torque from the output shaft or shafts of the internal combustion engine 10 and/or electric motor 12 in various alternative transmission stages to the drive wheels of the motor vehicle.

In a further method step S2, the master control unit 22a divides the calculated value for the total target torque 30 into values for individual target torques 32 which are allocated to the three drive units 20 and transmits the corresponding values to the other (slave) control units 22b. Based on these values for individual target torques 32, all three control units 22 then trigger the actuators (not shown) of the drive units. The corresponding actuators of the two engine sections 18 of the internal combustion engine 10 may be fuel injectors, for example, a control valve (throttle valve) integrated in each inlet gas line (not shown) of the sub-engines (18), a phase angle adjusting device and/or cam switching device of a valve timing mechanism and/or a device for controlling the throughflow of a compressor and/or a turbine of an exhaust gas turbocharger, for example in the form of a so-called VGT device. A corresponding actuator for the electric motor 12 may be a voltage regulator, for example, by means of which electric voltage is applied to the electric motor 12 in a controlled manner.

The drive units 20 are additionally provided with a large number of sensors (not shown), which act to determine specific operating parameters for the drive units. Examples of appropriate sensors which may be used for the engine sections 18 of the internal combustion engine 10 are: speed sensors, location and position sensors, for example for a control valve (throttle valve) integrated in an inlet gas line, cylinder pressure sensors, temperature sensors and flow measurement sensors, such as, for example, a thermoelectric anemometer. Examples of appropriate sensors which may be used with the electric motor 12 are speed sensors and temperature sensors.

The sensors assigned to the individual drive units 20 transmit their readings to the associated control units 22 which evaluate them in a further method step S3 and derive a value for the threshold torque 34 of the associated drive unit 22 from them. The threshold torques are the maximum torques dependent on the current operating conditions which may be produced by the individual drive units 20. The values of these threshold torques 34 are transmitted by the two slave control units 22b to the master control unit 22a and, as with the value for the threshold torque of the drive unit 20 associated with the master control unit 22a, are taken into account when subsequently dividing a calculated total target torque 30 into individual target torques 32 assigned to individual drive units 20. The same applies to values which quantify the actual torques 36 produced by the individual drive units 20.

A total actual torque 42 may be determined by the engine control system from the total of the actual torques 36 which are transmitted to the control device 26 of the electronic stability program and/or to the transmission 28 (in particular where designed as an automatic transmission 28) or a control device of this transmission 28, to be used to adapt the operation of the electronic stability program and/or the transmission 28.

When the values for the threshold torques 34 of the engine sections 18 of the internal combustion engine 10 are transmitted, it may be provided that these are linked in a further step S4 to a total threshold torque 38 of the internal combustion engine 10 before these are taken into account in dividing the total target torque 30 into individual target torques 32.

Data may be transmitted 40 between the control units 22, for example, by means of a CAN bus.

KEY TO REFERENCE SYMBOLS

10 Internal combustion engine
12 Electric motor
14 Bank of cylinders
16 Cylinder
18 Sub-engine
20 Drive unit
22 Control unit
22a Master control unit
22b Slave control unit
24 Accelerator pedal
26 Control device
28 Transmission
30 Total target torque
32 Individual target torque
34 Threshold torque
36 Actual torque
38 Total threshold torque
40 Data transmission
42 Total actual torque
44 Signals

The invention claimed is:

1. A method for controlling a drive system with at least two drive units, each of which is paired with at least one control unit, wherein
a total target torque is calculated by a master control unit,
the total target torque is subdivided by the master control unit into a respective individual target torque for each of the drive units; and
the drive units are controlled by the control units assigned to them on the basis of the associated individual target torques, wherein associated threshold torques for each of the drive units are determined and are taken into account by the master control unit in the apportionment of the total target torque, wherein each associated threshold torque is a maximum torque which may be produced by an associated drive unit under current operating conditions.

2. The method in accordance with claim 1, wherein, if an individual target torque determined for a drive unit exceeds the associated threshold torque, the corresponding torque difference is added, as far as is possible, to the determined individual target torque of the other drive unit.

3. The method in accordance with claim 1, wherein the actual torques associated with the drive units are determined and a total actual torque is determined from them by the master control unit.

4. The method in accordance with claim 3, wherein the total actual torque is transmitted to a functional element, whose functionality is controlled according to the total actual torque.

5. The method in accordance with claim 4, wherein the total target torque is determined as a function of a parameter which is transmitted by the function element to the master control unit.

6. The method in accordance with claim 1, comprising the implementation of a drive system with an internal combustion engine as drive unit and an electric motor as drive unit.

7. The method in accordance with claim 1, comprising the implementation with a drive system with an internal combustion engine, which is sub-divided into a plurality of sub-engines, each representing a drive unit, to which a control unit is assigned.

8. The method in accordance with claim 7, wherein when the individual target torque determined for a first sub-engine exceeds the associated threshold torque, the individual target torque determined or to be determined for a second engine section is reduced or limited to the threshold torque of the first sub-engine.

9. The method in accordance with claim 2, comprising the implementation of a drive system with an internal combustion engine as drive unit and an electric motor as drive unit; the internal combustion engine, being sub-divided into a plurality of sub-engines, each representing a drive unit, to which a control unit is assigned; in that when the individual target torque determined for a first sub-engine exceeds the associated threshold torque, the individual target torque determined or to be determined for a second engine section is reduced or limited to the threshold torque of the first sub-engine; and wherein if the individual target torque determined for a first engine section exceeds the associated threshold torque, the individual target torque determined or to be determined for a second sub-engine is reduced or restricted to the threshold torque of the first sub-engine and the total of the torque differences of the sub-engines is added, so far as possible, to the individual target torque of the electric motor.

10. A device system with at least two drive units, each of which is paired with at least one control unit and a master control unit; wherein the master control unit and the control unit associated with the drive units are programmed so as to execute a method comprising: the master control unit calculating a total target torque and subdividing the total target torque into an associated individual target torque for each of the drive units and the control units assigned to the drive units controlling the drive units on the basis of the associated individual target torques, wherein the threshold torques for each of the drive units are determined and are taken into account by the master control unit in the apportionment of the total target torque, wherein the threshold torques are maximum torques which may be produced by each associated drive unit under current operating conditions.

11. The device system in accordance with claim 10, comprising a combustion engine as drive unit and an electric motor as drive unit.

12. The device system in accordance with claim 10, comprising an internal combustion engine, which is sub-divided into several sub-engines, each comprising a drive unit and each associated with a control unit.

13. The device system in accordance with claim 11, comprising an internal combustion engine, which is sub-divided into several sub-engines, each comprising a drive unit and each associated with a control unit.

14. The method in accordance with claim 6, comprising the implementation with a drive system with an internal combustion engine, which is sub-divided into a plurality of sub-engines, each representing a drive unit, to which a control unit is assigned.

15. The method in accordance with claim 14, wherein when the individual target torque determined for a first sub-engine exceeds the associated threshold torque, the individual target torque determined or to be determined for a second engine section is reduced or limited to the threshold torque of the first sub-engine.

16. The method in accordance with claim 2, wherein the actual torques associated with the drive units are determined and a total actual torque is determined from them by the master control unit.

17. The method in accordance with claim 16, wherein the total actual torque is transmitted to a functional element, whose functionality is controlled according to the total actual torque.

18. The method in accordance with claim 17, wherein the total target torque is determined as a function of a parameter which is transmitted by the function element to the master control unit.

19. The method in accordance with claim 15, wherein the actual torques associated with the drive units are determined and a total actual torque is determined from them by the master control unit.

20. The method in accordance with claim 19, wherein the total actual torque is transmitted to a functional element, whose functionality is controlled according to the total actual torque.

21. The method in accordance with claim 1 wherein the threshold torques for each of the drive units are determined by each control unit associated with the drive unit and transmitted by each control unit to the master control unit.

* * * * *